United States Patent
Shen et al.

(10) Patent No.: US 10,305,804 B2
(45) Date of Patent: May 28, 2019

(54) METHOD FOR PROCESSING NETWORK CONGESTION AND SWITCH

(71) Applicant: HUAWEI TECHNOLOGIES CO., LTD., Shenzhen, Guangdong (CN)

(72) Inventors: Li Shen, Nanjing (CN); Liang Xia, Nanjing (CN); Duoliang Fan, Nanjing (CN); Heyang Liu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 9 days.

(21) Appl. No.: 15/810,747

(22) Filed: Nov. 13, 2017

(65) Prior Publication Data
US 2018/0069795 A1 Mar. 8, 2018

Related U.S. Application Data

(63) Continuation of application No. PCT/CN2015/099549, filed on Dec. 29, 2015.

(30) Foreign Application Priority Data

May 14, 2015 (CN) .......................... 2015 1 0245361

(51) Int. Cl.
H04L 12/803 (2013.01)
H04L 12/705 (2013.01)
H04L 12/825 (2013.01)

(52) U.S. Cl.
CPC ............ H04L 47/122 (2013.01); H04L 45/18 (2013.01); H04L 47/125 (2013.01); H04L 47/26 (2013.01)

(58) Field of Classification Search
CPC ..... H04L 47/122; H04L 45/18; H04L 47/125; H04L 47/26
See application file for complete search history.

(56) References Cited

U.S. PATENT DOCUMENTS 7,613,116 B1 11/2009 Medina
8,385,208 B1 2/2013 Medina
(Continued)

FOREIGN PATENT DOCUMENTS

CN 101123587 A 2/2008
CN 102946361 A 2/2013
(Continued)

OTHER PUBLICATIONS

International Search Report dated Apr. 1, 2016 in corresponding International Patent Application No. PCT/CN2015/099549.
(Continued)

*Primary Examiner* — Duc C Ho
(74) *Attorney, Agent, or Firm* — Staas & Halsey LLP (57) ABSTRACT

Embodiments of the present invention disclose a method for processing network congestion. A first switch obtains total traffic that is received by a receiving port communicating with a third switch. The total traffic includes traffic that is occupied by a data flow sent by a second switch, and the first switch. When the first switch determines, according to the total traffic, that a sending port of the third switch is congested, the first switch determines a target port. The target port is another port that can receive the data flow and that is selected from receiving ports of the first switch. The first switch sends an adjustment message to the second switch. The adjustment message carries an identifier of the data flow and an identifier of the target port, and the adjustment message is used by the second switch to send the data flow to the target port.

16 Claims, 4 Drawing Sheets

```
┌─────────────────────────────────────────────────────────┐
│ A first switch obtains total traffic that is received  │ ─ 101
│ by a receiving port communicating with a third switch, │
│ where the total traffic includes traffic that is       │
│ occupied by a data flow sent by a second switch, and   │
│ the first switch and the second switch are located at  │
│ a lower level of the third switch                      │
└─────────────────────────────────────────────────────────┘
                          │
                          ▼
┌─────────────────────────────────────────────────────────┐
│ When the first switch determines, according to the     │ ─ 102
│ total traffic, that a sending port of the third switch │
│ is congested, the first switch determines a target     │
│ port, where the target port is another port that can   │
│ receive the data flow and that is selected from        │
│ receiving ports of the first switch                    │
└─────────────────────────────────────────────────────────┘
                          │
                          ▼
┌─────────────────────────────────────────────────────────┐
│ The first switch sends an adjustment message to the    │ ─ 103
│ second switch, where the adjustment message carries    │
│ an identifier of the data flow and an identifier of    │
│ the target port, and the adjustment message is used    │
│ by the second switch to send the data flow to the      │
│ target port                                            │
└─────────────────────────────────────────────────────────┘
```

(56) References Cited

U.S. PATENT DOCUMENTS

| | | | | |
|---|---|---|---|---|
| 8,391,144 B1* | 3/2013 | Pannell | .................. | H04L 47/10 |
| | | | | 370/230 |
| 8,441,922 B1* | 5/2013 | McGlaughlin | ........ | H04L 49/506 |
| | | | | 370/218 |
| 2010/0061242 A1* | 3/2010 | Sindhu | ................ | H04L 41/0806 |
| | | | | 370/235 |
| 2015/0365325 A1* | 12/2015 | Hwang | .................. | H04L 47/70 |
| | | | | 370/230 |

FOREIGN PATENT DOCUMENTS

| | | |
|---|---|---|
| CN | 103179046 A | 6/2013 |
| CN | 104468353 A | 3/2015 |
| GB | 2467424 | 8/2010 |

OTHER PUBLICATIONS

Written Opinion of the International Searching Authority dated Apr. 1, 2016 in corresponding International Patent Application No. PCT/CN2015/099549.
Extended European Search Report, dated Apr. 24, 2018, in European Application No. 15891723.7 (5 pp.).

\* cited by examiner

FIG. 1

```
┌─────────────────────────────────────────────────────────────────────┐
│  A first switch obtains total traffic that is received by a receiving port    │──── 101
│  communicating with a third switch, where the total traffic includes traffic that is │
│  occupied by a data flow sent by a second switch, and the first switch and the │
│  second switch are located at a lower level of the third switch               │
└─────────────────────────────────────────────────────────────────────┘
                                    │
                                    ▼
┌─────────────────────────────────────────────────────────────────────┐
│  When the first switch determines, according to the total traffic, that a sending │──── 102
│  port of the third switch is congested, the first switch determines a target port,  │
│  where the target port is another port that can receive the data flow and that is  │
│  selected from receiving ports of the first switch                             │
└─────────────────────────────────────────────────────────────────────┘
                                    │
                                    ▼
┌─────────────────────────────────────────────────────────────────────┐
│  The first switch sends an adjustment message to the second switch, where the   │──── 103
│  adjustment message carries an identifier of the data flow and an identifier of the │
│  target port, and the adjustment message is used by the second switch to send the │
│  data flow to the target port                                                 │
└─────────────────────────────────────────────────────────────────────┘
```

In a process in which a second switch sends a data flow to a receiving port of a first switch by using a first sending port communicating with a third switch, the second switch receives an adjustment message that is sent by the first switch by using the third switch, where the first switch and the second switch are located at a lower level of the third switch, the adjustment message includes an identifier of the data flow and an identifier of a target port, and the target port is another port that can receive the data flow in receiving ports of the first switch ⟵ 401

If the identifier of the target port is a port number, and ports having a same port number of the first switch and the second switch are connected to a same upper-level switch, the second switch determines a port having the port number in sending ports of the second switch as the second sending port, where the second sending port is a port that is used by the second switch to communicate with a fourth switch ⟵ 402

The second switch sends the data flow by using the second sending port, so that the data flow reaches the target port by using the fourth switch ⟵ 403

METHOD FOR PROCESSING NETWORK CONGESTION AND SWITCH

CROSS-REFERENCE TO RELATED APPLICATIONS

This application is a continuation of International Application No. PCT/CN2015/099549, filed on Dec. 29, 2015, which claims priority to Chinese Patent Application No. 201510245361.7, filed on May 14, 2015, The disclosures of the aforementioned applications are hereby incorporated by reference in their entireties.

TECHNICAL FIELD

The present invention relates to the field of data processing, and in particular, to a method for processing network congestion and a switch.

BACKGROUND

Data centers (DC) are more widely created by cloud service providers and enterprises. A load balance effect of a network architecture (Fabric) of a data center on network traffic directly affects user experience. A poor load balance affect refers to that congestion packet loss occurs when utilization of the Fabric is still low. In contrast, a desirable load balance effect refers to that congestion packet loss occurs when utilization of the Fabric is relatively high. There are two types of Fabric congestion packet loss. One type is that local load is unbalanced, for example, an equal-cost multi-path (ECMP) manner or a random load balance manner. Specifically, multiple large flows are mapped to one same link after hash, causing that aggregated traffic exceeds a capacity of a port and leading to congestion. For the other type, because switches separately perform load balancing, multiple switches at a same level may send multiple large flows to one same switch at another level, causing that downlink traffic are aggregated and causing congestion.

There are currently two methods for resolving the foregoing two types of congestion. In a first method, for each new flow, hash is performed by using a 10-tuple. One equal-cost link is selected from all equal-cost links according to a result of the hash, and an edge switch (edge switch) detects a large flow on each link. When traffic of a link on which a large flow exists exceeds a preset threshold, reporting is performed to inform a flow scheduler (flow scheduler). The flow scheduler linearly searches, according to links collected in real time, for all possible equal-cost links to which the large flow may be scheduled. When a first matched equal-cost link is found, the large flow is scheduled to the equal-cost link. In a second method, for each new flow, a first switch selects a link with smallest load for each new flow. A load status of a link may be obtained according to the following method: In an overlay network, the first switch encapsulates a congestion field (including a port number that is of the first switch and that corresponds to each link, and a congestion metric value of each link) into an overlay header of each packet. After the congestion field is sent to a second switch, the second switch stores the congestion field, and then feeds back an updated congestion field (including a port number that is of the first switch and that corresponds to each link, and an updated congestion metric value of each link) to the first switch by using a reverse packet. The first switch stores the updated congestion field in a table. In this way, the first switch can select an optimal link according to the updated congestion field.

In the foregoing first method, a large flow and a status of each link need to be reported in real time. Consequently, in a large-scale data center, a data flow is very large, a response is slow, and network utilization of the data center is not high. In the second method, an application scenario is limited. Consequently, network utilization of a data center is not high either.

SUMMARY

Embodiments of the present invention provide a method for processing network congestion and a switch, to improve network utilization of a data center.

In view of this, a first aspect of the present invention provides a method for processing network congestion, where the method may include:

obtaining, by a first switch, total traffic that is received by a receiving port communicating with a third switch, where the total traffic includes traffic that is occupied by a data flow sent by a second switch, and the first switch and the second switch are located at a lower level of the third switch;

when the first switch determines, according to the total traffic, that a sending port of the third switch is congested, determining, by the first switch, a target port, where the target port is another port that can receive the data flow and that is selected from receiving ports of the first switch; and sending, by the first switch, an adjustment message to the second switch, where the adjustment message carries an identifier of the data flow and an identifier of the target port, and the adjustment message is used by the second switch to send the data flow to the target port.

With reference to the first aspect of the present invention, in a first implementation of the first aspect of the present invention, the method may include:

if the total traffic reaches a first preset threshold of a capacity of the sending port of the third switch, determining, by the first switch, that the sending port of the third switch is congested.

With reference to the first implementation of the first aspect of the present invention, in a second implementation of the first aspect of the present invention, the method may include:

the data flow is a data flow that occupies largest traffic in data flows included in the total traffic.

With reference to the first aspect of the present invention, in a third implementation of the first aspect of the present invention, the method may include:

obtaining, by the first switch, total traffic received by each of the receiving ports that are used by the first switch to communicate with multiple upper-level switches, where the multiple upper-level switches include the third switch, and the receiving port that is used by the first switch to communicate with the third switch is a port whose traffic is the largest in the receiving ports; and the determining a target port includes:

if a difference between the total traffic received by the receiving port that is used by the first switch to communicate with the third switch and reference traffic is greater than a second preset threshold, determining, by the first switch, that load of downlinks of the third switch is unbalanced, and determining the target port, where the reference traffic is smallest total traffic in the total traffic received by the receiving ports of the first switch.

With reference to the first aspect of the present invention, in a fourth implementation of the first aspect of the present invention, the method may include:

obtaining, by the first switch, total traffic sent by each of sending ports of the first switch; and when total traffic sent by a first sending port reaches a third preset threshold and total traffic sent by a second sending port is less than a fourth preset threshold, scheduling, by the first switch to the second sending port, at least one data flow that is sent by using the first sending port, so that total traffic of the first sending port that is obtained through adjustment is less than the third preset threshold, and total traffic of the second sending port that is obtained through adjustment is less than the fourth preset threshold.

In view of this, a second aspect of the present invention provides a method for processing network congestion, where the method may include:

in a process in which a second switch sends a data flow to a receiving port of a first switch by using a first sending port communicating with a third switch, receiving, by the second switch, an adjustment message that is sent by the first switch by using the third switch, where the first switch and the second switch are located at a lower level of the third switch, the adjustment message includes an identifier of the data flow and an identifier of a target port, and the target port is another port that can receive the data flow in receiving ports of the first switch;

determining, by the second switch according to the adjustment message, a second sending port that corresponds to the target port, where the second sending port is a port that is used by the second switch to communicate with a fourth switch, and the fourth switch and the third switch are located at a same level; and sending, by the second switch, the data flow by using the second sending port, so that the data flow reaches the target port by using the fourth switch.

With reference to the second aspect of the present invention, in a first implementation of the second aspect of the present invention, the method may include:

when the identifier of the target port is a port number, and ports having a same port number of the first switch and the second switch are connected to a same upper-level switch, the determining, by the second switch according to the adjustment message, a second sending port that corresponds to the target port includes: determining, by the second switch, a port having the port number in sending ports of the second switch as the second sending port.

With reference to the second aspect of the present invention, in a second implementation of the second aspect of the present invention, the method may include:

searching, by the second switch, a correspondence table according to the identifier of the target port to obtain an entry that includes the identifier of the target port, and obtaining the second sending port according to the entry, where each entry of the correspondence table includes a correspondence among an identifier of a sending port, an identifier of an upper-level switch, and an identifier of a target port.

In view of this, a third aspect of the present invention provides a switch, where the switch is used as a first switch and may include:

a first obtaining unit, configured to obtain total traffic that is received by a receiving port communicating with a third switch, where the total traffic includes traffic that is occupied by a data flow sent by a second switch, and the first switch and the second switch are located at a lower level of the third switch;

a determining unit, configured to: when it is determined, according to the total traffic, that a sending port of the third switch is congested, determine a target port, where the target port is another port that can receive the data flow and that is selected from receiving ports of the first switch; and a sending unit, configured to send an adjustment message to the second switch, where the adjustment message carries an identifier of the data flow and an identifier of the target port, and the adjustment message is used by the second switch to send the data flow to the target port.

With reference to the third aspect of the present invention, in a first implementation of the third aspect of the present invention, the switch may include:

the determining unit is specifically configured to: if the total traffic reaches a first preset threshold of a capacity of the sending port of the third switch, determine that the sending port of the third switch is congested, and determine the target port.

With reference to the first implementation of the third aspect of the present invention, in a second implementation of the third aspect of the present invention, the switch may include:

the data flow is a data flow that occupies largest traffic in data flows included in the total traffic.

With reference to the third aspect of the present invention, in a third implementation of the third aspect of the present invention, the switch may include:

a second obtaining unit, configured to obtain total traffic received by each of the receiving ports that are used by the first switch to communicate with multiple upper-level switches, where the multiple upper-level switches include the third switch, and the receiving port that is used by the first switch to communicate with the third switch is a port whose traffic is the largest in the receiving ports; and the determining unit is specifically configured to: if a difference between the total traffic received by the receiving port that is used by the first switch to communicate with the third switch and reference traffic is greater than a second preset threshold, determine that determine that load of downlinks of the third switch is unbalanced, and determine the target port, where the reference traffic is smallest total traffic in the total traffic received by the receiving ports of the first switch.

With reference to the third aspect of the present invention, in a fourth implementation of the third aspect of the present invention, the switch may include:

a third obtaining unit, configured to obtain total traffic sent by each of sending ports of the first switch; and a scheduling unit, configured to: when total traffic sent by a first sending port reaches a third preset threshold and total traffic sent by a second sending port is less than a fourth preset threshold, schedule, to the second sending port, at least one data flow that is sent by using the first sending port, so that total traffic of the first sending port that is obtained through adjustment is less than the third preset threshold, and total traffic of the second sending port that is obtained through adjustment is less than the fourth preset threshold.

In view of this, a fourth aspect of the present invention provides a switch, where the switch is used as a second switch and may include:

a receiving unit, configured to: in a process in which the second switch sends a data flow to a receiving port of a first switch by using a first sending port communicating with a third switch, receive an adjustment message that is sent by the first switch by using the third switch, where the first switch and the second switch are located at a lower level of the third switch, the adjustment message includes an identifier of the data flow and an identifier of a target port, and the target port is another port that can receive the data flow in receiving ports of the first switch;

a determining unit, configured to determine, according to the adjustment message, a second sending port that corresponds to the target port, where the second sending port is a port that is used by the second switch to communicate with a fourth switch, and the fourth switch and the third switch are located at a same level; and a sending unit, configured to send the data flow by using the second sending port, so that the data flow reaches the target port by using the fourth switch.

With reference to the fourth aspect of the present invention, in a first implementation of the fourth aspect of the present invention, the switch may include:

when the identifier of the target port is a port number, and ports having a same port number of the first switch and the second switch are connected to a same upper-level switch, the determining unit is specifically configured to determine a port having the port number in sending ports of the second switch as the second sending port.

With reference to the fourth aspect of the present invention, in a second implementation of the fourth aspect of the present invention, the switch may include:

the determining unit is specifically configured to: search a correspondence table according to the identifier of the target port to obtain an entry that includes the identifier of the target port, and obtain the second sending port according to the entry, where each entry of the correspondence table includes a correspondence among an identifier of a sending port, an identifier of an upper-level switch, and an identifier of a target port.

It can be seen from the foregoing technical solutions that, the embodiments of the present invention have the following advantages: A first switch obtains total traffic that is received by a receiving port communicating with a third switch. The total traffic includes traffic that is occupied by a data flow sent by a second switch, and the first switch and the second switch are located at a lower level of the third switch. The first switch determines, according to the total traffic, whether a sending port of the third switch is congested, and when the sending port of the third switch is congested, determines a target port. The target port is a port that can receive the data flow and that is selected from receiving ports of the first switch. It means that a data flow that needs to he adjusted is a data flow from the second switch. The first switch informs the second switch of an identifier of the data flow and an identifier of the target port by sending an adjustment message to the second switch. In this way, by using the two identifiers, the second switch can determine a sending port of the second switch to send the data flow, and determine a fourth switch, so that the data flow reaches the target port by using the fourth switch, where the fourth switch and the third switch are located at a same level. Therefore, a congestion problem is resolved. It can be seen that, the present invention can improve network utilization of a data center.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a method for processing network congestion and a switch, to improve network utilization of a data center.

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

For ease of understanding the embodiments of the present invention, a network architecture introduced to the embodiments of the present invention is described below.

Figure 1:
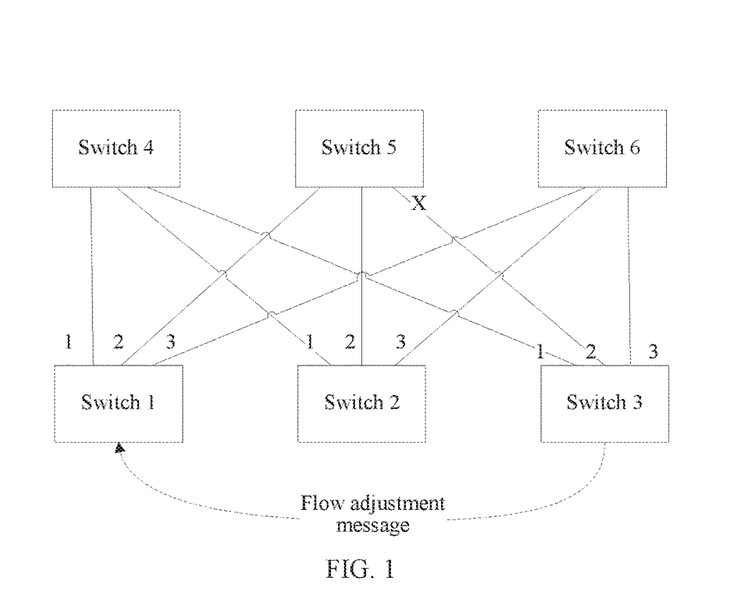
FIG. 1 is a schematic structural diagram of a network architecture according to an embodiment of the present invention.

As shown in FIG. 1, the network architecture includes multiple upper-level switches and multiple lower-level switches. Each lower-level switch is connected to all the upper-level switches, and each upper-level switch is connected to all the lower-level switches. There is no direct link between the upper-level switches.

FIG. 1 shows six switches. A switch 1, a switch 2, and a switch 3 are located, at a lower level; and a switch 4, a switch 5, and a switch 6 are located at an upper level. Ports having a same number of all the lower-level switches are connected to a same upper-level switch. It should be noted that, in another embodiment, ports having different numbers of different lower-level switches may be connected to a same upper-level switch. In this embodiment of the present invention, it only needs to ensure that each lower-level switch provides a port connected to a same upper-level switch. That is, a port 1 of the switch 1, a port 1 of the switch 2, and a port 1 of the switch 3 are not necessarily connected to a same upper-level switch. For example, the port 1 of the switch 2 may correspond to a port 2 of the switch 1 according to a pre-configured correspondence. When ports having different numbers of different lower-level switches are connected to a same upper-level switch, to ensure that data traffic (which is referred to as traffic for short below) is correctly forwarded, a switch further needs to store a correspondence table. Each entry of the correspondence table includes a correspondence among a sending port of the switch, a remote switch, and a port of the remote switch.

It can be seen from FIG. 1 that, during traffic transmission, traffic sent by a sending port of an upper-level switch is equal to traffic that is received by a lower-level switch by using a receiving port that interconnects with the sending port of the upper-level switch.

That ports having a same number of all the lower-level switches are connected to a same upper-level switch in FIG. 1 is used an example. The switch 1 sends a first data flow to a port 2 of the switch 3 by using the port 2 of the switch 1, where the first data flow passes through the switch 5. Simultaneously, the switch 2 sends a second data flow to the port 2 of the switch 3 by using a port 2 of the switch 2, where the second data. flow also passes through the switch 5. Consequently, a sending port X from the switch 5 to the switch 3 may be congested (where the switch 5 is only used as an example herein, and in an actual scenario, congestion in a sending port of an upper-level switch is not limited to congestion in a sending port of one specific switch; and a problem that needs to be resolved in the present invention is essentially a problem of resolving a congestion problem of sending ports of upper-level switches). Because traffic received by the port 2 of the switch 3 is equal to traffic sent by the sending port X of the switch 5, it may be determined, by determining the traffic of the port 2 of the switch 3, whether the sending port X of the switch 5 is congested. When it is determined that the sending port X of the switch 5 is congested, the switch 3 sends an adjustment message to the switch 1 or the switch 2, so that the switch 1 adjusts the first data flow to the port 1 or a port 3 of the switch 3; or the switch 3 sends an adjustment message to the switch 2, so that the switch 2 adjusts the second data flow to the port 1 or a port 3 of the switch 3. That is, the traffic sent by the sending port X of the switch 5 is reduced. A reason why the switch 3 can adjust a port that receives a data flow is that there is a correspondence among a sending port of each switch, an upper-level switch, and a port of another switch. When port numbers of the sending port and the port are the same, the correspondence may not be stored on the switch. When port numbers of the sending port and the port are different, the switch needs to store the correspondence. When the switch 3 sends the adjustment message, the adjustment message carries a new port determined by the switch 3. The switch 1 or the switch 2 that receives the adjustment message may determine a sending port of the switch 1 or the switch 2 according to the port, and send the data flow by using the sending port. In the foregoing manner, a congestion problem of the sending port X of the switch 5 can be resolved.

Figure 2:
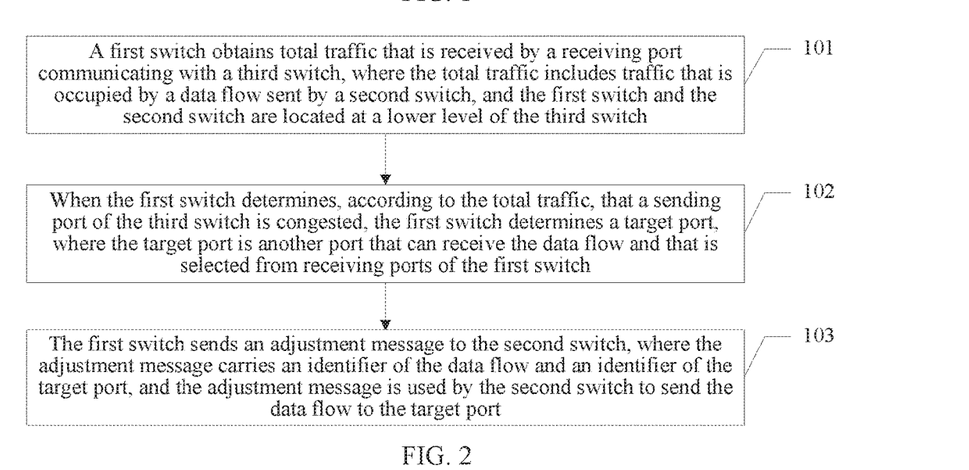
FIG. 2 is a schematic flowchart of a method for processing network congestion according to an embodiment of the present invention.

Referring to FIG. 2, a method for processing network congestion according to an embodiment of the present invention includes the following steps.

101: A first switch obtains total traffic that is received by a receiving port communicating with a third switch, where the total traffic includes traffic that is occupied by a data. flow sent by a second switch, and the first switch and the second switch are located at a lower level of the third switch.

In this embodiment, during traffic transmission, traffic sent by a sending port of an upper-level switch is equal to traffic that is received by a lower-level switch by using a receiving port that interconnects with the sending port of the upper-level switch. Therefore, if the first switch obtains the total traffic that is received by the receiving port communicating with the third switch, traffic sent by a sending port of the third switch is determined. The total traffic includes the traffic that is occupied by the data flow sent by the second switch, and the first switch and the second switch are located at the lower level of the third switch.

It can be seen that, whether the sending port of the third switch is congested may be determined by detecting the total traffic of the receiving port of the first switch.

102: When the first switch determines, according to the total traffic, that a sending port of the third switch is congested, the first switch determines a target port, where the target port is another port that can receive the data flow and that is selected from receiving ports of the first switch.

After the first switch obtains the total traffic of the receiving port of the first switch, if the first switch determines, according to the total traffic, that the sending port of the third switch is congested, the first switch determines the target port. The target port is a port that can receive the data flow and that is selected from the receiving ports of the first switch.

103: The first switch sends an adjustment message to the second switch, where the adjustment message carries an identifier of the data flow and an identifier of the target port, and the adjustment message is used by the second switch to send the data flow to the target port.

After determining the target port, the first switch sends the adjustment message to the second switch. The adjustment message carries the identifier of the data flow and the identifier of the target port, and the adjustment message is used by the second switch to send the data flow to the target port.

In addition, the identifier of the data flow may be a 5-tuple.

It can be understood that, after receiving the two identifiers, the second switch may determine a sending port according to the two identifiers, and send the data flow to the target port by using the sending port.

Optionally, in this embodiment, the method may further include: obtaining, by the first switch, total traffic sent by each of sending ports of the first switch; and when total traffic sent by a first sending port reaches a third preset threshold and total traffic sent by a second sending port is less than a fourth preset threshold, scheduling, by the first switch to the second sending port, at least one data flow that is sent by using the first sending port, so that total traffic of the first sending port that is obtained through adjustment is less than the third preset threshold, and total traffic of the second sending port that is obtained through adjustment is less than the fourth preset threshold. By using the foregoing method, a congestion problem of the first sending port of the first switch can be resolved.

Optionally, in this embodiment, the method may further include: obtaining, by the first switch, total traffic received by each of the receiving ports that are used by the first switch to communicate with multiple upper-level switches, where the multiple upper-level switches include the third switch, and the receiving port that is used by the first switch to communicate with the third switch is a port whose traffic is the largest in the receiving ports; and if a difference between the total traffic received by the receiving port that is used by the first switch to communicate with the third switch and reference traffic is greater than a second preset threshold, determining, by the first switch, that load of downlinks of the third switch is unbalanced, and determining the target port, where the reference traffic is smallest total traffic in the total traffic received by the receiving ports of the first switch. By using the foregoing method, a load imbalance problem can be resolved.

In this embodiment, a first switch obtains total traffic that is received by a receiving port communicating with a third switch. The total traffic includes traffic that is occupied by a data flow sent by a second switch, and the first switch and the second switch are located at a lower level of the third switch. The first switch determines, according to the total traffic, whether a sending port of the third switch is congested, and when the sending port of the third switch is congested, determines a target port. The target port is a port that can receive the data flow and that is selected from receiving ports of the first switch. It means that a data flow that needs to be adjusted is a data flow from the second switch. The first switch informs the second switch of an identifier of the data flow and an identifier of the target port by sending an adjustment message to the second switch, so that the second switch sends the data flow to the target port. It can be seen that, the present invention can improve network utilization of a data center.

Figure 3:
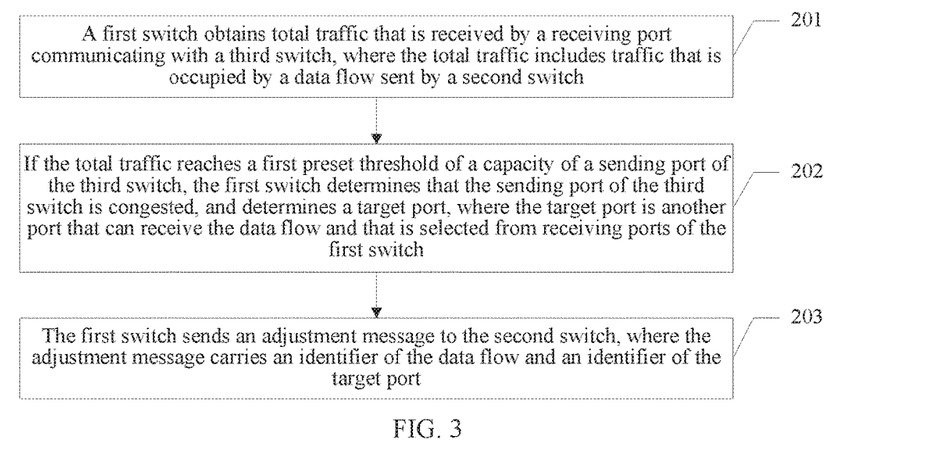
FIG. 3 is another schematic flowchart of a method for processing network congestion according to an embodiment of the present invention.

For ease of understanding, a method for processing network congestion according to an embodiment of the present invention is described in detail below. Referring to FIG. 3, another method for processing network congestion according to an embodiment of the present invention includes the following steps.

201: A first switch obtains total traffic that is received by a receiving port communicating with a third switch, where the total traffic includes traffic that is occupied by a data flow sent by a second switch.

In this embodiment, during traffic transmission, traffic sent by a sending port of an upper-level switch is equal to traffic that is received by a lower-level switch by using a receiving port that interconnects with the sending port of the upper-level switch. Therefore, if the first switch obtains the total traffic that is received by the receiving port communicating with the third switch, traffic sent by a sending port of the third switch is determined. The total traffic includes the traffic that is occupied by the data flow sent by the second switch, and the first switch and the second switch are located at a lower level of the third switch.

It can be seen that, whether the sending port of the third switch is congested may be determined by detecting the total traffic of the receiving port of the first switch.

It should be noted that, the total traffic of the receiving port of the first switch may be periodically obtained once every preset period. The preset period may be 1 ms, or may be another value. For details, no limitation is imposed herein.

It can be understood that, for brevity of description, one receiving port is used in this embodiment for description. Alternatively, multiple receiving ports may be used for description. A used method is similar, and is not limited herein.

202: If the total traffic reaches a first preset threshold of a capacity of a sending port of the third switch, the first switch determines that the sending port of the third switch is congested, and determines a target port, where the target port is another port that can receive the data flow and that is selected from receiving ports of the first switch.

If the total traffic reaches the first preset threshold of the capacity of the sending port of the third switch, the first switch determines that the sending port of the third switch is congested, and determines the target port, where the target port is another port that can receive the data flow and that is selected from the receiving ports of the first switch.

The first preset threshold may be 99% or 90%, or may be another manually set value. For details, no limitation is imposed herein.

The data flow is a data flow that occupies largest traffic in data flows included in the total traffic.

203: The first switch sends an adjustment message to the second switch, where the adjustment message carries an identifier of the data flow and an identifier of the target port.

The first switch constructs the adjustment message, where the adjustment message carries the identifier of the data flow and the identifier of the target port, and sends the adjustment message to the second switch by using the User Datagram Protocol (UDP, User Datagram Protocol). The adjustment message may be sent by using another protocol, which is not limited to the UDP protocol. For details, no limitation is imposed herein.

In addition, the identifier of the data flow may be a 5-tuple.

It can be understood that, after receiving the two identifiers, the second switch may determine a sending port according to the two identifiers, and send the data flow to the target port by using the sending port.

This embodiment provides a method for determining, by determining whether the traffic received by the receiving port of the first switch reaches the first preset threshold of the capacity of the sending port of the third switch, whether the sending port of the third switch is congested, where it is determined that the data flow is a data flow that occupies largest traffic in the data flows included in the total traffic, and the adjustment message is sent to the second switch by using the UDP protocol, thereby increasing solution selectivity.

A method for processing network congestion according to an embodiment of the present invention is described above from a perspective of a first switch, and a method for processing network congestion according to an embodiment of the present invention is described below from a perspective of a second switch.

Figure 4:
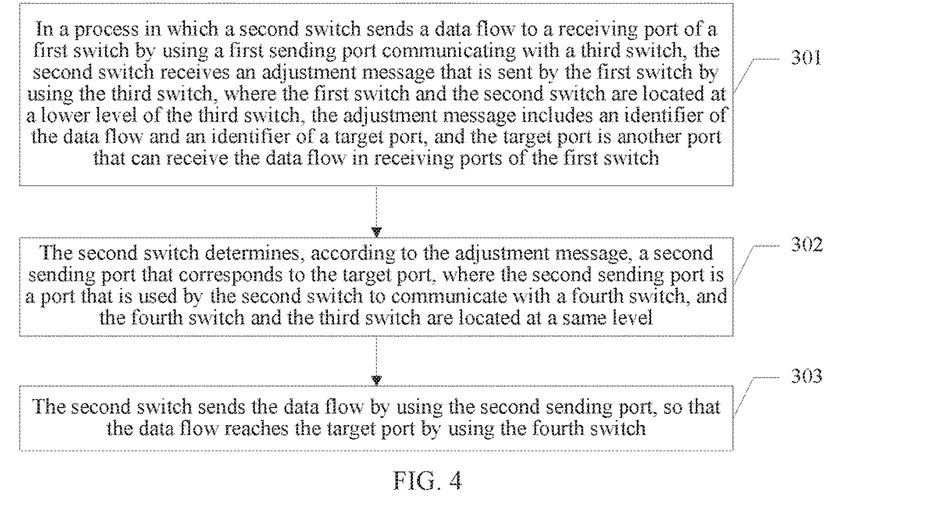
FIG. 4 is a schematic flowchart of a method for processing network congestion according to an embodiment of the present invention.

Referring to FIG. 4, a method for processing network congestion according to an embodiment of the present invention includes the following steps.

301: In a process in which a second switch sends a data flow to a receiving port of a first switch by using a first sending port communicating with a third switch, the second switch receives an adjustment message that is sent by the first switch by using the third switch, where the first switch and the second switch are located at a lower level of the third switch, the adjustment message includes an identifier of the data flow and an identifier of a target port, and the target port is another port that can receive the data flow in receiving ports of the first switch.

In this embodiment, in the process in which the second switch sends the data flow to the first switch by using the first sending port communicating with the third switch, the first switch sends the adjustment message by using the third switch, and the second switch receives the adjustment message. The adjustment message includes the identifier of the data flow and the identifier of a target port, the first switch and the second switch are located at the lower level of the third switch, and the target port is another port that can receive the data flow in the receiving ports of the first switch.

The adjustment message may be sent to the second switch by using the UDP protocol or by using another protocol. For details, no limitation is imposed herein.

302: The second switch determines, according to the adjustment message, a second sending port that corresponds to the target port, where the second sending port is a port that is used by the second switch to communicate with a fourth switch, and the fourth switch and the third switch are located at a same level.

The second switch determines, according to the identifier of the data flow and the identifier of the target port that are in the adjustment message, the second sending port that corresponds to the target port. The second sending port is a port that is used by the second switch to communicate with the fourth switch, and the fourth switch and the third switch are located at the same level.

It should be noted that, the second sending port that corresponds to the target port may be determined by using multiple methods. For example, when the identifier of the target port is a port number, a port having the port number in sending ports of the second switch is determined as the second sending port.

303: The second switch sends the data flow by using the second sending port, so that the data flow reaches the target port by using the fourth switch.

After determining the second sending port, the second switch sends the data flow by using the second sending port, so that the data flow reaches the target port by using the fourth switch.

In this embodiment, a second switch sends a data flow by using another sending port according to an identifier of the data flow and an identifier of a target port that are in an adjustment message, and sends the data flow to the target port by using a different upper-level switch. Therefore, a method for adjusting a data flow is provided.

Figure 5:
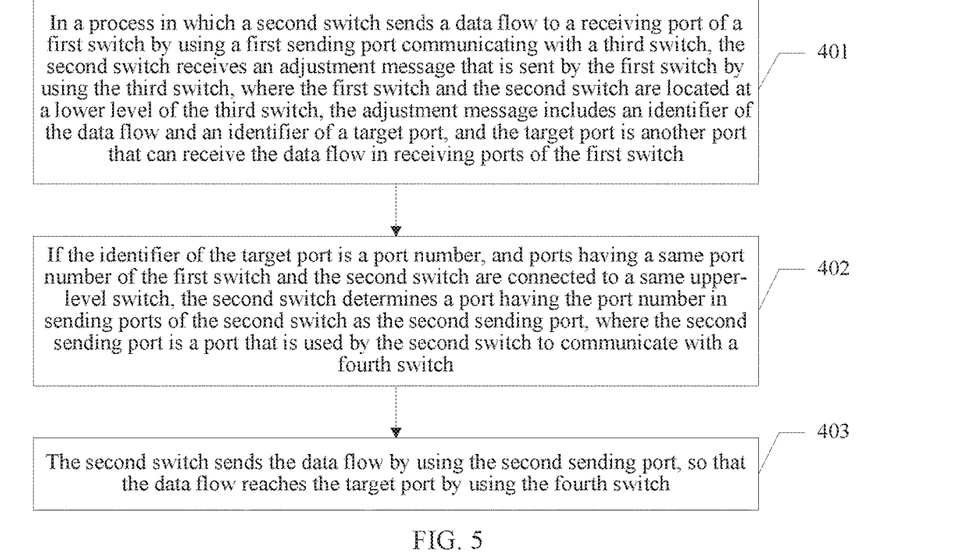
FIG. 5 is another schematic flowchart of a method for processing network congestion according to an embodiment of the present invention.

For ease of understanding, a method for processing network congestion according to an embodiment of the present invention is described in detail below. Referring to FIG. 5, another method for processing network congestion according to an embodiment of the present invention includes the following steps.

401: In a process in which a second switch sends a data flow to a receiving port of a first switch by using a first sending port communicating with a third switch, the second switch receives an adjustment message that is sent by the first switch by using the third switch, where the first switch and the second switch are located at a lower level of the third switch, the adjustment message includes an identifier of the data flow and an identifier of a target port, and the target port is another port that can receive the data flow in receiving ports of the first switch.

In this embodiment, step 401 is similar to step 301, and is not described in detail herein.

402: If the identifier of the target port is a port number, and ports having a same port number of the first switch and the second switch are connected to a same upper-level switch, the second switch determines a port having the port number in sending ports of the second switch as a second sending port, where the second sending port is a port that is used by the second switch to communicate with a fourth switch.

When the identifier of the target port is a port number, the port number of the target port is determined. When ports having a same port number of the first switch and the second switch are connected to a same upper-level switch, a port having the port number in the sending ports of the second switch is determined as the second sending port. The second sending port is a port that is used by the second switch to communicate with the fourth switch, and the fourth switch and the third switch are located at the same level.

Optionally, step 402 may also be:

searching, by the second switch, a correspondence table according to the identifier of the target port to obtain an entry that includes the identifier of the target port, and obtaining the second sending port according to the entry, where each entry of the correspondence table includes a correspondence among an identifier of a sending port, an identifier of an upper-level switch, and an identifier of a target port.

in this case, the first switch and the second switch are not necessarily connected to a same upper-level switch by using ports having a same port number. The second sending port that corresponds to the target port may be determined according to an entry in the correspondence table, where the entry includes a correspondence among an identifier of a sending port, an identifier of an upper-level switch, and an identifier of a target port.

403: The second switch sends the data flow by using the second sending port, so that the data flow reaches the target port by using the fourth switch.

After determining the second sending port, the second switch sends the data flow by using the second sending port. so that the data flow reaches the target port by using the fourth switch.

This embodiment provides two methods for determining a second sending port, thereby increasing solution selectivity.

For ease of understanding, a method for processing network congestion according to an embodiment of the present invention is described below by using an actual application scenario.

A switch A periodically checks total traffic of a receiving port a1 of the switch A once every period of 1 ms, and determines that the total traffic reaches 99% of a capacity of a sending port c1 that is of a switch C and that interconnects with the receiving port a1, and exceeds a preset threshold 95% of the capacity of the sending port c1. Because traffic received by the receiving port a1 is equal to traffic sent by the sending port c1, the sending port c1 is in a congestion state. The switch A selects, a flow that is provided with no adjustment mark and that is the largest at the receiving port a1, as a target data flow (where a source of the target data flow is a switch B, the switch B sends the target data flow to the switch A by using the switch C, and the switch A and the switch B are located at a lower level of the switch C), sets an adjustment mark for the target data flow, and simultaneously selects, from receiving ports of the switch A, a receiving port a2 that can receive the target data flow. After determining the receiving port a2, the switch A constructs an adjustment message, where the adjustment message carries an identifier of the target data flow and an identifier of the receiving port a2. The adjustment message is borne by using the UDP, and the adjustment message is sent to the switch B by using a special UDP port number. After receiving the adjustment message, the switch B determines that the identifier of the receiving port a2 is a port number 2, and determines that ports having a same port number of the switch A and the switch B are connected to the switch C. The switch B determines a sending port b2 having the port number 2 in sending ports of the switch B. The sending port b2 is a port that is used by the switch B to communicate with a switch D, and the switch D and the switch C are located at a same level. The switch B sends the target data flow by using the sending port b2, so that the target data flow reaches the receiving port a2 by using the switch D.

Figure 6:
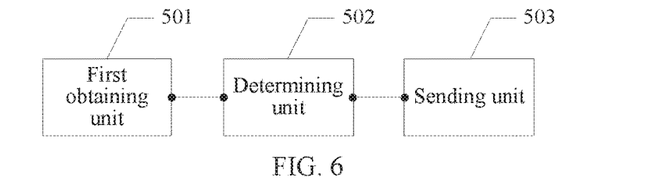
FIG. 6 is a schematic structural diagram of a switch according to an embodiment of the present invention.

A switch according to an embodiment of the present invention is described below. The switch is used as a first switch. Referring to FIG. 6, an embodiment of the switch in the present invention includes:

a first obtaining unit 501, configured to obtain total traffic that is received by a receiving port communicating with a third switch, where the total traffic includes traffic that is occupied by a data flow sent by a second switch, and the first switch and the second switch are located at a lower level of the third switch;

a determining unit 502, configured to: when it is determined, according to the total traffic obtained by the first obtaining unit 501, that a sending port of the third switch is congested, determine a target port, where the target port is another port that can receive the data flow and that is selected from receiving ports of the first switch; and a sending unit 503, configured to: after the determining unit 502 determines that the sending port of the third switch is congested and determines the target port, send an adjustment message to the second switch, where the adjustment message carries an identifier of the data flow and an identifier of the target port, and the adjustment message is used by the second switch to send the data flow to the target port The determining unit 502 is specifically configured to: if the total traffic reaches a first preset threshold of a capacity of the sending port of the third switch, determine that the sending port of the third switch is congested, and determine the target port. The target port is another port that can receive the data flow and that is selected from the receiving ports of the first switch. The data flow is a data flow that occupies largest traffic in data flows included in the total traffic.

Optionally, this embodiment further includes:

a second obtaining unit 504, configured to obtain total traffic received by each of the receiving ports that are used by the first switch to communicate with multiple upper-level switches, where the multiple upper-level switches include the third switch, and the receiving port that is used by the first switch to communicate with the third switch is a port whose traffic is the largest in the receiving ports.

The determining unit 502 may be further specifically configured to: if a difference between the total traffic received by the receiving port that is used by the first switch to communicate with the third switch and reference traffic is greater than a second preset threshold, determine that determine that load of downlinks of the third switch is unbalanced, and determine the target port, where the reference traffic is smallest total traffic in the total traffic received by the receiving ports of the first switch.

Optionally, this embodiment further includes:

a third obtaining unit 505, configured to obtain total traffic sent by each of sending ports of the first switch; and a scheduling unit 506, configured to: when total traffic sent by a first sending port reaches a third preset threshold and total traffic sent by a second sending port is less than a fourth preset threshold, schedule, to the second sending port, at least one data flow that is sent by using the first sending port, so that total traffic of the first sending port that is obtained through adjustment is less than the third preset threshold, and total traffic of the second sending port that is obtained through adjustment is less than the fourth preset threshold.

In this embodiment, the first obtaining unit 501 obtains total traffic that is received by a receiving port communicating with a third switch. The total traffic includes traffic that is occupied by a data flow sent by a second switch, and the first switch and the second switch are located at a lower level of the third switch. It is determined, according to the total traffic, whether a sending port of the third switch is congested. When determining that the sending port is congested, the determining unit 502 determines a target port. The target port is a port that can receive the data flow and that is selected from receiving ports of the first switch. It means that a data flow that needs to be adjusted is a data flow from the second switch. The sending unit 503 informs the second switch of an identifier of the data flow and an identifier of the target port by sending an adjustment message to the second switch, so that the second switch sends the data flow to the target port. In addition, in this embodiment, a load imbalance problem can be resolved, and a congestion problem of a first sending port of the first switch can be resolved. It can be seen that, the present invention can improve network utilization of a data center.

In addition, this embodiment provides a method for determining, by determining whether the traffic received by the receiving port of the first switch reaches the first preset threshold of the capacity of the sending port of the third switch, whether the sending port of the third switch is congested, where it is determined that the data flow is a data flow that occupies largest traffic in the data flows included in the total traffic, thereby increasing solution selectivity.

Figure 7:
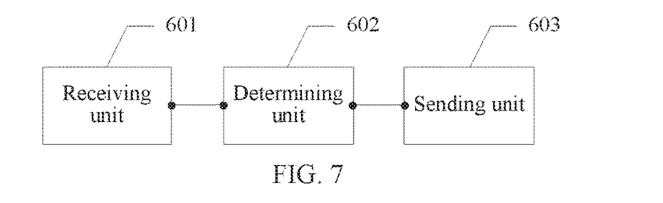
FIG. 7 is another schematic structural diagram of a switch according to an embodiment of the present invention.

A switch according to an embodiment of the present invention is described below. The switch is used as a second switch. Referring to FIG. 7, an embodiment of the switch in the present invention includes:

a receiving unit 601, configured to: in a process in which the second switch sends a data flow to a receiving port of a first switch by using a first sending port communicating with a third switch, receive an adjustment message that is sent by the first switch by using the third switch, where the first switch and the second switch are located at a lower level of the third switch, the adjustment message includes an identifier of the data flow and an identifier of a target port, and the target port is another port that can receive the data flow in receiving ports of the first switch;

a determining unit 602, configured to determine, according to the adjustment message received by the receiving unit 601, a second sending port that corresponds to the target port, where the second sending port is a port that is used by the second switch to communicate with a fourth switch, and the fourth switch and the third switch are located at a same level; and a sending unit 603, configured to send the data flow by using the second sending port determined by the determining unit 602, so that the data flow reaches the target port by using the fourth switch.

If the identifier of the target port is a port number, and ports having a same port number of the first switch and the second switch are connected to a same upper-level switch, the determining unit 602 is specifically configured to determine a port having the port number in sending ports of the second switch as the second sending port.

In this embodiment, the determining unit 602 may be further specifically configured to search: a correspondence table according to the identifier of the target port to obtain an entry that includes the identifier of the target port, and obtain the second sending port according to the entry, where each entry of the correspondence table includes a correspondence among an identifier of a sending port, an identifier of an upper-level switch, and an identifier of a target port.

In this embodiment, the second switch sends a data flow by using another sending port according to an identifier of the data flow and an identifier of a target port that are in an adjustment message, and sends the data flow to the target port by using a different upper-level switch. Therefore, a method for adjusting a data flow is provided.

In addition, this embodiment provides two methods for determining a second sending port, thereby increasing solution selectivity.

For ease of understanding, interaction between units of switches in the present invention is described below by using an actual application scenario.

During traffic transmission, traffic sent by a sending port of an upper-level switch is equal to traffic that is received by a lower-level switch by using a receiving port that interconnects with the sending port of the upper-level switch. Therefore, if a first obtaining unit 501 of a first switch obtains total traffic that is received by a receiving port communicating with a third switch, traffic sent by a sending port of the third switch is determined. The total traffic includes traffic that is occupied by a data flow sent by a second switch, and the first switch and the second switch are located at a lower level of the third switch. It can be seen that, whether the sending port of the third switch is congested may be determined by detecting the total traffic of the receiving port of the first switch. If the total traffic reaches a first preset threshold of a capacity of the sending port of the third switch, a determining unit 502 determines that the sending port of the third switch is congested, and determines a target port. The target port is another port that can receive the data flow and that is selected from receiving ports of the first switch. The first preset threshold may be 99% or 90%, or may be another manually set value. The data flow is a data flow that occupies largest traffic in data flows included in the total traffic. The first switch constructs an adjustment message, where the adjustment message carries an identifier of the data flow and an identifier of the target port. A sending unit 503 sends the adjustment message to the second switch by using the UDP. A receiving unit 601 of the second switch receives the adjustment message. A determining unit 602 determines, according to the identifier of the data flow and the identifier of the target port that are in the adjustment message, a second sending port that corresponds to the target port. The second sending port is a port that is used by the second switch to communicate with a fourth switch, and the fourth switch and the third switch are located at a same level. When the identifier of the target port is a port number, the port number of the target port is determined. When ports having a same port number of the first switch and the second switch are connected to a same upper-level switch, the determining unit 602 determines a port having the port number in sending ports of the second switch as the second sending port. The second sending port is a port that is used by the second switch to communicate with the fourth switch, and the fourth switch and the third switch are located at the same level. After determining the second sending port, a sending unit 603 sends the data flow by using the second sending port, so that the data flow reaches the target port by using the fourth switch.

Figure 8:
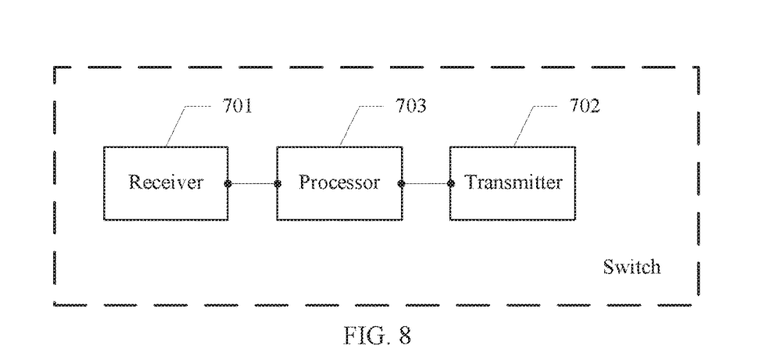
FIG. 8 is a schematic diagram of a switch according to an embodiment of the present invention.

An embodiment of the present invention further provides a switch. The switch is used as a first switch, and as shown in FIG. 8, includes: a receiver 701, a transmitter 702, and a processor 703.

The processor 703 is configured to control and execute: obtaining total traffic that is received by a receiving port communicating with a third switch, where the total traffic includes traffic that is occupied by a data flow sent by a second switch, and the first switch and the second switch are located at a lower level of the third switch; when the first switch determines, according to the total traffic, that a sending port of the third switch is congested, determining a target port, where the target port is another port that can receive the data flow and that is selected from receiving ports of the first switch; and sending, by the first switch, an adjustment message to the second switch, where the adjustment message carries an identifier of the data flow and an identifier of the target port, and the adjustment message is used by the second switch to send the data flow to the target port.

In this embodiment, a first switch obtains total traffic that is received by a receiving port communicating with a third switch. The total traffic includes traffic that is occupied by a data flow sent by a second switch, and the first switch and the second switch are located at a lower level of the third switch. The first switch determines, according to the total traffic, whether a sending port of the third switch is congested, and when the sending port of the third switch is congested, determines a target port. The target port is a port that can receive the data flow and that is selected from receiving ports of the first switch. It means that a data flow that needs to be adjusted is a data flow from the second switch. The first switch informs the second switch of an identifier of the data flow and an identifier of the target port by sending an adjustment message to the second switch, so that the second switch sends the data flow to the target port. It can be seen that, the present invention can improve network utilization of a data center.

This embodiment further provides a solution of determining, according to the total traffic, that the sending port of the third switch is congested. As shown below, the processor 703 is specifically configured to control and execute: if the total traffic reaches a first preset threshold of a capacity of the sending port of the third switch, determining, by the first switch, that the sending port of the third switch is congested.

An embodiment of the present invention further provides a switch. The switch is used as a second switch, and as shown in FIG. 8, includes: a receiver 701, a transmitter 702, and a processor 703.

The processor 703 is configured to control and execute: in a process in which the second switch sends a data flow to a receiving port of a first switch by using a first sending port communicating with a third switch, receiving, by the second switch, an adjustment message that is sent by the first switch by using the third switch, where the first switch and the second switch are located at a lower level of the third switch, the adjustment message includes an identifier of the data flow and an identifier of a target port, and the target port is another port that can receive the data flow in receiving ports of the first switch; determining, by the second switch according to the adjustment message, a second sending port that corresponds to the target port, where the second sending port is a port that is used by the second switch to communicate with a fourth switch, and the fourth switch and the third switch are located at a same level; and sending, by the second switch, the data flow by using the second sending port, so that the data flow reaches the target port by using the fourth switch.

This embodiment further provides a specific implementation solution of determining the second sending port. As shown below, the processor 703 is specifically configured to control and execute: when the identifier of the target port is a port number, and ports having a same port number of the first switch and the second switch are connected to a same upper-level switch, the determining, by the second switch according to the adjustment message, a second sending port that corresponds to the target port includes: determining, by the second switch, a port having the port number in sending ports of the second switch as the second sending port.

This embodiment further provides another specific implementation solution of determining the second sending port. As shown below, the processor 703 is specifically configured to control and execute: searching, by the second switch, a correspondence table according to the identifier of the target port to obtain an entry that includes the identifier of the target port, and obtaining the second sending port according to the entry, where each entry of the correspondence table includes a correspondence among an identifier of a sending port, an identifier of an upper-level switch, and an identifier of a target port.

Figure 9:
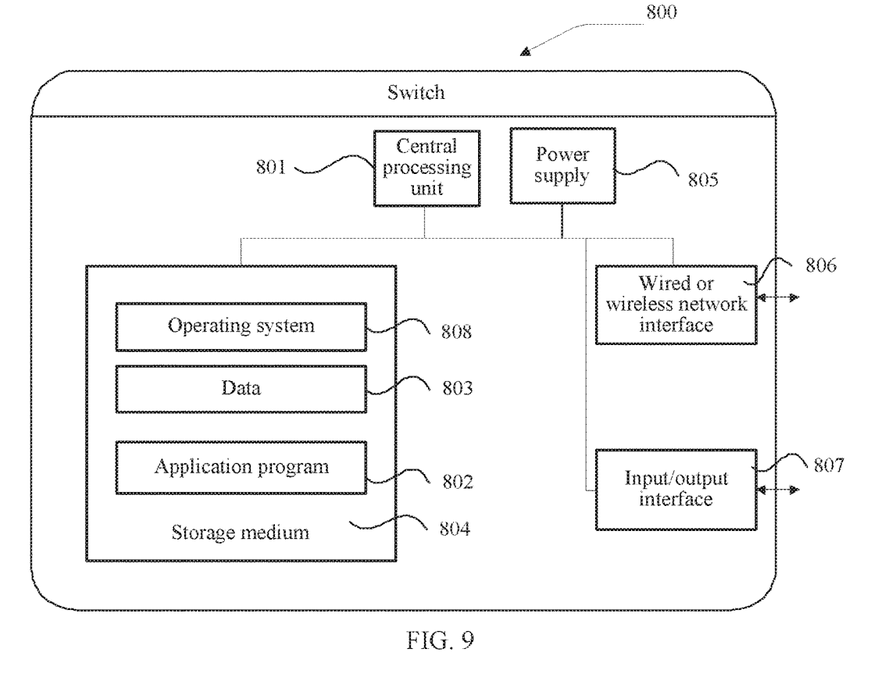
FIG. 9 is another schematic diagram of a switch according to an embodiment of the present invention.

An embodiment of the present invention further provides a switch. Referring to FIG. 9, another embodiment of a switch according to an embodiment of present invention includes:

FIG. 9 is a schematic structural diagram of a switch according to an embodiment of the present invention. The switch 800 may vary greatly due to different configurations or performance, and. may include one or more central processing units (central processing units, CPU) 801 (for example, one or more processors), and one or more storage mediums 804 (for example, one or more mass storage devices) that store an application programs 802 or data 803. The storage medium 804 may be a transient or persistent storage. The program stored in the storage medium 804 may include one or more modules (not shown in the figure), and each module may include a series of instruction operations for the switch. Even further, the central processing unit 801 may be set to communicate with the storage medium 804, and perform, on the switch 800, a series of instruction operations in the storage medium 804.

The switch 800 may further include one or more power supplies 805, one or more wired or wireless network interfaces 806, one or more input/output interfaces 807, and/or one or more operating systems 808, for example, Windows Server™, Mac OS X™, Unix™, Linux™, and FreeBSD™.

The steps performed by the switches in the foregoing embodiments may be based on a structure of the switch shown in the FIG. 9.

This embodiment of the present invention has the following advantages:

A first switch obtains total traffic that is received by a receiving port communicating with a third switch. The total traffic includes traffic that is occupied by a data flow sent by a second switch, and the first switch and the second switch are located at a lower level of the third switch. The first switch determines, according to the total traffic, whether a sending port of the third switch is congested, and when the sending port of the third switch is congested, determines a target port. The target port is a port that can receive the data flow and that is selected from receiving ports of the first switch. It means that a data flow that needs to be adjusted is a data flow from the second switch. The first switch informs the second switch of an identifier of the data flow and an identifier of the target port by sending an adjustment message to the second switch, so that the second switch sends the data flow to the target port. It can be seen that, the present invention can improve network utilization of a data center.

It can be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for processing network congestion, comprising:

obtaining, by a first switch, total traffic that is received by a receiving port communicating with a third switch, wherein the total traffic comprises traffic that is occupied by a data flow sent by a second switch, and the first switch and the second switch are located at a lower level of the third switch;

when the first switch determines, according to the total traffic, that a sending port of the third switch is congested, determining, by the first switch, a target port, wherein the target port is another port that can receive the data flow and that is selected from receiving ports of the first switch; and sending, by the first switch, an adjustment message to the second switch, wherein the adjustment message carries an identifier of the data flow and an identifier of the target port, and the adjustment message is used by the second switch to send the data flow to the target port.

2. The method according to claim 1, wherein the determining, by the first switch according to the total traffic, that a sending port of the third switch is congested comprises:
if the total traffic reaches a first preset threshold of a capacity of the sending port of the third switch, determining, by the first switch, that the sending port of the third switch is congested.

3. The method according to claim 2, wherein the data flow is a data flow that occupies largest traffic in data flows comprised in the total traffic.

4. The method according to claim 1, wherein the method further comprises:
obtaining, by the first switch, total traffic received by each of the receiving ports that are used by the first switch to communicate with multiple upper-level switches, Wherein the multiple upper-level switches comprise the third switch, and the receiving port that is used by the first switch to communicate with the third switch is a port whose traffic is the largest in the receiving ports; and the determining a target port comprises:
if a difference between the total traffic received by the receiving port that is used by the first switch to communicate with the third switch and reference traffic is greater than a second preset threshold, determining, by the first switch, that load of downlinks of the third switch is unbalanced, and determining the target port, wherein the reference traffic is smallest total traffic in the total traffic received by the receiving ports of the first switch.

5. The method according to claim 1, wherein the method further comprises:
obtaining, by the first switch, total traffic sent by each of sending ports of the first switch; and
when total traffic sent by a first sending port reaches a third preset threshold and total traffic sent by a second sending port is less than a fourth preset threshold, scheduling, by the first switch to the second sending port, at least one data flow that is sent by using the first sending port, so that total traffic of the first sending port that is obtained through adjustment is less than the third preset threshold, and total traffic of the second sending port that is obtained through adjustment is less than the fourth preset threshold.

6. A method for processing network congestion, comprising:
in a process in which a second switch sends a data flow to a receiving port of a first switch by using a first sending port communicating with a third switch, receiving, by the second switch, an adjustment message that is sent by the first switch by using the third switch, wherein the first switch and the second switch are located at a lower level of the third switch, the adjustment message comprises an identifier of the data flow and an identifier of a target port, and the target port is another port that can receive the data flow in receiving ports of the first switch;

determining, by the second switch according to the adjustment message, a second sending port that corresponds to the target port, wherein the second sending port is a port that is used by the second switch to communicate with a fourth switch, and the fourth switch and the third switch are located at a same level; and sending, by the second switch, the data flow by using the second sending port, so that the data flow reaches the target port by using the fourth switch.

7. The method according to claim 6, wherein when the identifier of the target port is a port number, and ports having a same port number of the first switch and the second switch are connected to a same upper-level switch, the determining, by the second switch according to the adjustment message, a second sending port that corresponds to the target port comprises: determining, by the second switch, a port having the port number in sending ports of the second switch as the second sending port.

8. The method according to claim 6, wherein the determining, by the second switch according to the adjustment message, a second sending port that corresponds to the target port comprises:
searching, by the second switch, a correspondence table according to the identifier of the target port to obtain an entry that comprises the identifier of the target port, and obtaining the second sending port according to the entry, wherein each entry of the correspondence table comprises a correspondence among an identifier of a sending port, an identifier of an upper-level switch, and an identifier of a target port.

9. A switch, used as a first switch and comprising:
a first obtaining unit, configured to obtain total traffic that is received by a receiving port communicating with a third switch, wherein the total traffic comprises traffic that is occupied by a data flow sent by a second switch, and the first switch and the second switch are located at a lower level of the third switch;

a determining unit, configured to: when it is determined, according to the total traffic, that a sending port of the third switch is congested, determine a target port, wherein the target port is another port that can receive the data flow and that is selected from receiving ports of the first switch; and a sending unit, configured to send an adjustment message to the second switch, wherein the adjustment message carries an identifier of the data flow and an identifier of the target port, and the adjustment message is used by the second switch to send the data flow to the target port.

10. The switch according to claim 9, wherein the determining unit is specifically configured to: if the total traffic reaches a first preset threshold of a capacity of the sending port of the third switch, determine that the sending port of the third switch is congested, and determine the target port.

11. The switch according to claim 10, wherein the data flow is a data flow that occupies largest traffic in data flows comprised in the total traffic.

12. The switch according to claim 9, wherein the switch further comprises:
a second obtaining unit, configured to obtain total traffic received by each of the receiving ports that are used by the first switch to communicate with multiple upper-level switches, wherein the multiple upper-level switches comprise the third switch, and the receiving port that is used by the first switch to communicate with the third switch is a port Whose traffic is the largest in the receiving ports; and the determining unit is specifically configured to: if a difference between the total traffic received by the receiving port that is used by the first switch to communicate with the third switch and reference traffic is greater than a second preset threshold, determine that determine that load of downlinks of the third switch is unbalanced, and determine the target port, wherein the reference traffic is smallest total traffic in the total traffic received by the receiving ports of the first switch.

13. The switch according to claim 9, wherein the switch further comprises:

a third obtaining unit, configured to obtain total traffic sent by each of sending ports of the first switch; and a scheduling unit, configured to: when total traffic sent by a first sending port reaches a third preset threshold and total traffic sent by a second sending port is less than a fourth preset threshold, schedule, to the second sending port, at least one data flow that is sent by using the first sending port, so that total traffic of the first sending port that is obtained through adjustment is less than the third preset threshold, and total traffic of the second sending port that is obtained through adjustment is less than the fourth preset threshold.

14. A switch, used as a second switch and comprising:

a receiving unit, configured to: in a process in which the second switch sends a data flow to a receiving port of a first switch by using a first sending port communicating with a third switch, receive an adjustment message that is sent by the first switch by using the third switch, wherein the first switch and the second switch are located at a lower level of the third switch, the adjustment message comprises an identifier of the data flow and an identifier of a target port, and the target port is another port that can receive the data flow in receiving ports of the first switch;

a determining unit, configured to determine, according to the adjustment message, a second sending port that corresponds to the target port, wherein the second sending port is a port that is used by the second switch to communicate with a fourth switch, and the fourth switch and the third switch are located at a same level; and a sending unit, configured to send the data flow by using the second sending port, so that the data flow reaches the target port by using the fourth switch.

15. The switch according to claim 14, wherein when the identifier of the target port is a port number, and ports having a same port number of the first switch and the second switch are connected to a same upper-level switch, the determining unit is specifically configured to determine a port having the port number in sending ports of the second switch as the second sending port.

16. The switch according to claim 14, wherein the determining unit is specifically configured to: search a correspondence table according to the identifier of the target port to obtain an entry that comprises the identifier of the target port, and obtain the second sending port according to the entry, wherein each entry of the correspondence table comprises a correspondence among an identifier of a sending port, an identifier of an upper-level switch, and an identifier of a target port.

* * * * *

UNITED STATES PATENT AND TRADEMARK OFFICE
CERTIFICATE OF CORRECTION

PATENT NO. : 10,305,804 B2
APPLICATION NO. : 15/810747
DATED : May 28, 2019
INVENTOR(S) : Li Shen et al.

Page 1 of 1

It is certified that error appears in the above-identified patent and that said Letters Patent is hereby corrected as shown below:

In the Claims

In Column 19, Line 28:
In Claim 4, delete "Wherein" and insert -- wherein --, therefor.

In Column 21, Line 2:
In Claim 12, delete "Whose" and insert -- whose --, therefor.

Signed and Sealed this
Nineteenth Day of November, 2019

Andrei Iancu
*Director of the United States Patent and Trademark Office*